L. M. PRYOR & J. L. TRAPP.
ELECTRIC WELDING MACHINE.
APPLICATION FILED JUNE 3, 1910.
984,603.
Patented Feb. 21, 1911.
3 SHEETS—SHEET 1.
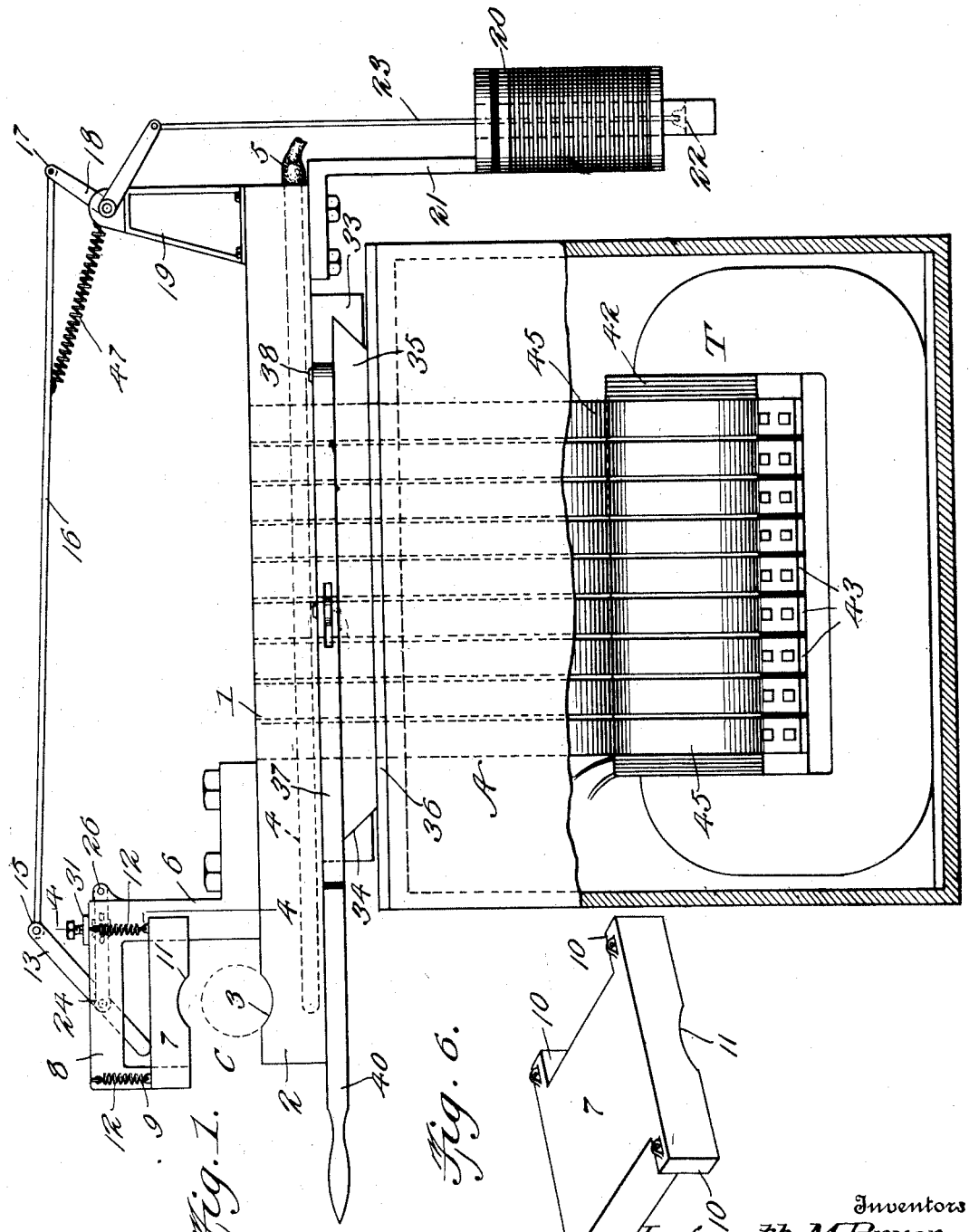

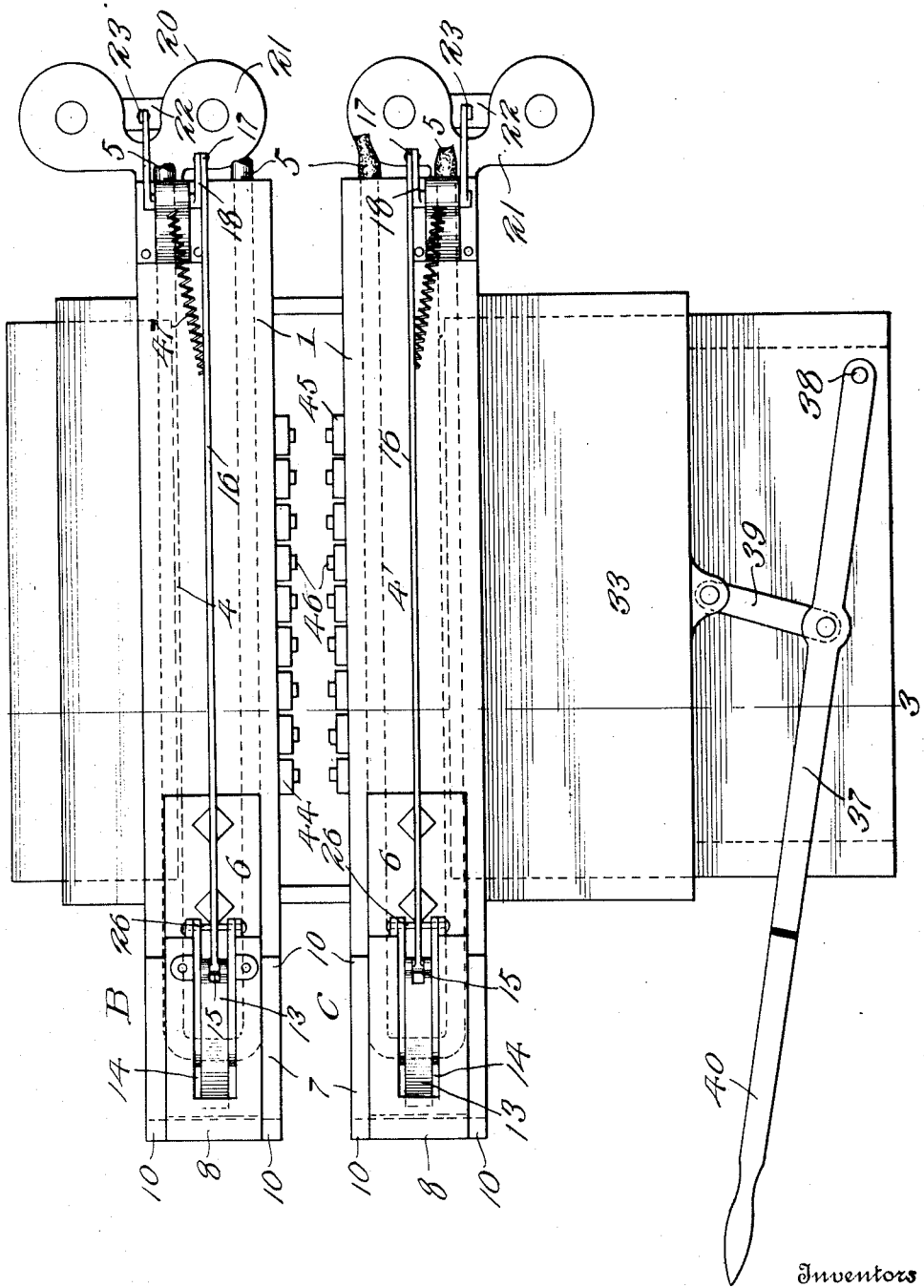

L. M. PRYOR & J. L. TRAPP.
ELECTRIC WELDING MACHINE.
APPLICATION FILED JUNE 3, 1910.
984,603.
Patented Feb. 21, 1911.
3 SHEETS—SHEET 3.
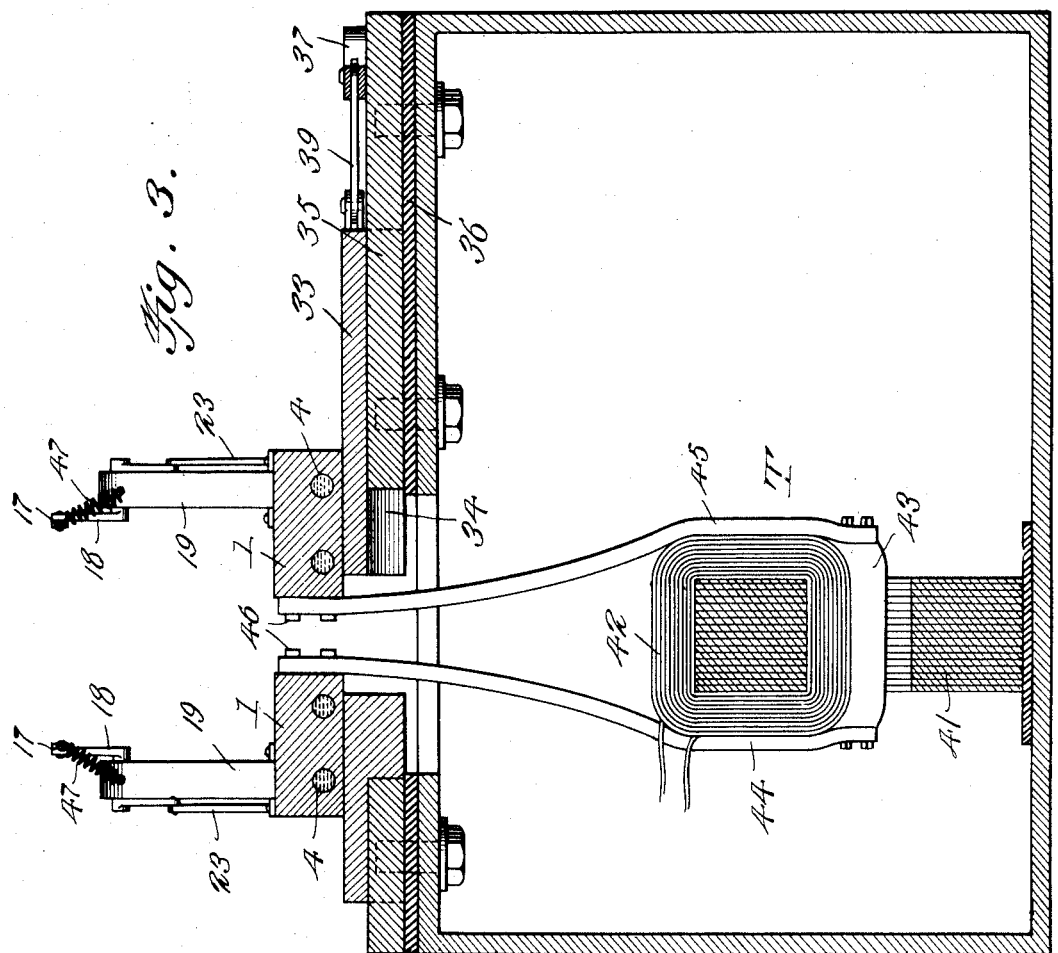
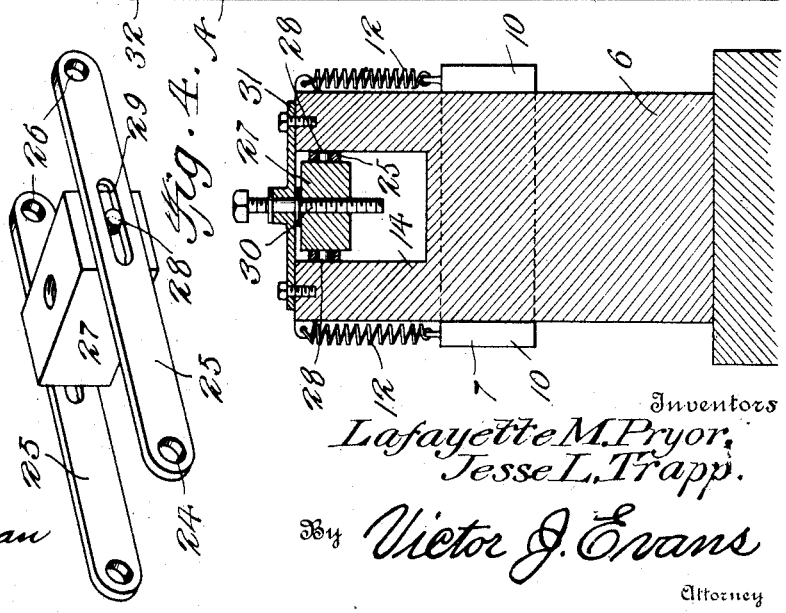
Witnesses
Frank B. Hoffman
C. Bradway
Inventors
Lafayette M. Pryor,
Jesse L. Trapp.
By Victor J. Evans
Attorney

UNITED STATES PATENT OFFICE.

LAFAYETTE M. PRYOR AND JESSE L. TRAPP, OF FRANKFORT, INDIANA.

ELECTRIC WELDING-MACHINE.

984,603.

Specification of Letters Patent.

Patented Feb. 21, 1911.

Application filed June 3, 1910. Serial No. 564,853.

*To all whom it may concern:*

Be it known that we, LAFAYETTE M. PRYOR and JESSE L. TRAPP, citizens of the United States, residing at Frankfort, in the county of Clinton and State of Indiana, have invented new and useful Improvements in Electric Welding-Machines, of which the following is a specification.

This invention relates to welding machines of that type in which the heating of the parts to be welded is effected by an electric current.

The invention has for one of its objects to improve and simplify the construction and operation of machines of this character so as to be comparatively simple and inexpensive to manufacture, reliable and efficient in use, and readily controlled.

Another object of the invention is the provision of improved means for clamping the work in the machine and holding the same in position for welding.

A further object of the invention is the provision of a novel current-converting device to which the work clamps are connected.

With these objects in view and others, as will appear as the description proceeds, the invention comprises the various novel features of construction and arrangement of parts which will be more fully described hereinafter and set forth with particularity in the claims appended hereto.

In the drawings, which illustrate one embodiment of the invention, Figure 1 is a side view of the machine with portions broken away. Fig. 2 is a plan view thereof. Fig. 3 is a vertical longitudinal section on line 3—3, Fig. 2. Fig. 4 is a vertical section on line 4—4, Fig. 1, taken through one of the work-holding clamps. Fig. 5 is a perspective view of the means for adjusting the movable jaw of each work clamp. Fig. 6 is a perspective view of the movable jaw of the work clamp.

Similar reference characters are employed to designate corresponding parts throughout the views.

Referring to the drawings, A designates a supporting frame of any suitable construction, on which are mounted the work clamps or carriers B and C, the latter being movable toward the former so that the necessary pressure can be applied to the pieces in the clamps for welding them together. Each clamp consists of a horizontal bar 1 of copper or other conducting material, the forward end of which forms a fixed jaw 2 and has its upper face provided with a work-receiving recess 3. The bar 1 extends from front to the rear of the machine and, as it carries the welding current, it is cored with passages 4 through which water is continuously circulated for keeping the fixed jaws relatively cool, the water flowing through conduits 5 connected with the rear ends of the bar 1. On the forward end of each bar is a bracket 6 that is set rearwardly from the recess 3 to form a support for the movable jaw 7. The bracket has a forwardly-extending plate portion 8 from which depends a flange 9 that is disposed parallel with the vertical portion of the bracket, and the jaw 7, which is in the form of a block, is recessed at its front and rear edges to provide corner lugs 10 that engage the sides of the bracket 6 and depending member 9 thereof. By this means, the movable jaw 7 can move freely toward and from the fixed jaw for clamping or unclamping the work, the under side of the movable jaw or block 7 being provided with the recess 11 opposite the recess 3. The movable jaw is normally held open by a suitable arrangement of helical extension springs 12 which may be fastened to the corners of the movable jaw and to the horizontal portion 8 of the bracket 6.

The means for operating each movable jaw consists of a lever 13 that is fulcrumed in an opening 14 in the horizontal portion 8 of the jaw-supporting bracket 6, and the lower end of this lever rides on the top surface of the jaw 7 to cause the latter to be clamped to the work when the lever is operated. The upper end of the lever is hingedly connected at 15 with a connecting rod 16 which has its rear end hingedly connected at 17 with a bell crank lever 18 mounted in an upwardly-extending bracket 19 on the rear end of the bar 1. This bell crank lever can be operated in any suitable manner by means under the control of the operator, but, in the present instance, the lever is operated by a solenoid 20 supported at the rear of the machine by a bracket 21 fastened to the bar 1, and the movable core 22 of the solenoid is connected by a link or rod 23 with the bell crank lever. The movable jaws of both clamps are of the same construction and each has its own actuating solenoid.

In order that the machine may be used for welding pieces of different dimensions, the movable jaw 7 can be adjusted accordingly, and for this purpose, the fulcrum point 24 of each lever 13 is capable of being shifted. The fulcrum 24 is carried by the forward ends of spaced members 25 which are disposed in the opening 14 of the bracket 6 and have their rear ends pivoted at 26 to the bracket. Between these members 25 is a block 27 that has journals 28 projecting from its ends and engaging in longitudinal slots 29 of the members 25, and passing vertically through this block is an adjusting screw 30 that is rotatably supported in a plate 31 fastened to the bracket 6 over the opening 14. By turning the screw, the block 27 will be raised or lowered to shift the position of the jaw-locking lever.

The bar 1 of the fixed clamp B is fastened to the frame A in any suitable manner but is insulated therefrom by a plate of insulation 32, Fig. 3. The bar 1 of the clamp C is fastened to a plate 33 that has a dove-tail groove 34 in its bottom, as shown in Fig. 1, the said plate forming a supporting slide that moves back and forth on a dove-tail web or guide 35 fastened to the frame A but insulated therefrom by a plate of insulation 36. This slide or carrier 33 can be moved back and forth by a horizontal swinging lever 37 fulcrumed at 38 on the guide 35 and connected by a link 39 with the slide 33. The handle 40 of the lever is disposed at the front of the machine so that the operator can move the slide to the right or left in the operation of the machine.

Suitably mounted on the frame is a transformer T that has a core 41 on which is wound a primary winding 42. Extending through the opening in the core are horizontal bars of copper 43 insulated from each other, and to the ends thereof are fastened copper strips or leads 44 and 45 that extend upwardly along opposite sides of the primary winding and are secured by bolts 46 to the inner faces of the bars 1, the said leads 45 being flexible so that the clamp C can readily move back and forth. The primary windings 42 and jaw-operating solenoids 20 can be connected with suitable sources of current and cut into and out of circuit in any suitable manner.

In operating the machine, the movable clamp C is first thrown outwardly away from the fixed clamp B, and the two parts to be welded are then placed on the fixed jaws of the clamps, and while supported in this manner, the solenoids are connected in circuit. As a result, the movable jaws are clamped to the work and after the primary winding is connected in circuit, the operator moves the operating lever 37 in a direction to shift the slidable clamp toward the movable clamp. This brings the two pieces to be welded into engagement with each other, so that the secondary circuit will be completed. Current now flows through the group of leads 45, bar 1 of the movable clamp, the piece to be welded supported thereby, through the piece in the fixed clamp, group of leads 44, and copper bars 43. As the meeting ends of the pieces fuse to the desired heat, the operator increases the pressure applied to the lever 37 so that the molecules of the molten metal will thoroughly intermingle and weld together. The current is now thrown off from the transformer and solenoids so that the welded work can be removed, the movable jaws automatically opening, when the levers 13 are released or retracted by springs 47.

From the foregoing description, taken in connection with the accompanying drawings, the advantages of the construction and of the method of operation will be readily apparent to those skilled in the art to which the invention appertains, and while we have described the principle of operation of the invention, together with the apparatus which we now consider to be the best embodiment thereof, we desire to have it understood that the apparatus shown is merely illustrative, and that such changes may be made when desired as are within the scope of the claims appended hereto.

Having thus described the invention, what we claim is:—

1. A machine of the class described comprising a supporting frame, relatively-movable clamps, a transformer core, a primary winding on the core, a plurality of bars disposed in inductive relation to the winding, and groups of leads connected with the bars and disposed in inductive relation to the winding, one group of leads being connected with one of the clamps and the other group with the other clamp.

2. A machine of the class described comprising a supporting frame, relatively-movable clamps, a transformer core, a primary winding on the core, a plurality of bars disposed in inductive relation to the winding, and groups of leads connected with the bars and disposed in inductive relation to the winding, each clamp including one of the bars to which one group of leads are connected.

3. An electric welding machine comprising relatively movable clamps, and means for connecting the clamps in circuit with a source of current, each clamp consisting of a bar forming a conductor for the welding current and serving as a fixed jaw, a movable jaw carried by each bar, springs for holding the movable jaw open, a lever mounted to close the movable jaw, a mechanism for operating the lever, and means for adjusting the position of the lever to vary the closing of the movable jaw according to the size of the work to be clamped between the jaws.

4. In a welding machine, a fixed jaw forming a conductor for current, a bracket mounted on the fixed jaw, a movable jaw guided on the bracket, a lever arranged to engage the movable jaw for closing the same, springs for opening the jaw, and quick-acting means connected with the lever for throwing the same to jaw-closing position.

5. In a welding machine, a fixed jaw forming a conductor for current, a bracket mounted on the fixed jaw, a movable jaw guided on the bracket, a lever arranged to engage the movable jaw for closing the same, springs for opening the jaw, and electrical means for throwing the lever to jaw-closing position.

6. In a welding machine, a fixed jaw forming a conductor for current, a bracket mounted on the fixed jaw, a movable jaw guided on the bracket, a lever arranged to engage the movable jaw for closing the same, springs for opening the jaw, electrical means for throwing the lever to jaw-closing position, and means for releasing the lever when the said electrical means is deënergized.

7. In an electric welding machine, the combination of a bar forming a conductor for current and serving as a fixed jaw, a bracket on the bar, a movable jaw slidably mounted on the bracket, a lever engaging the jaw for closing the same, means for adjustably mounting the lever on the bracket to change the closing position of the movable jaw, and means including an electro-magnet for operating the lever.

8. In an electric welding machine, the combination of a current conductor forming a fixed jaw, a movable jaw, means for mounting the movable jaw on the said conductor, means tending to hold the movable jaw open, a member for moving the jaw to closed position, an adjusting screw for changing the range of movement of the member, and means for actuating the member.

9. In an electric welding machine, the combination of a bar forming a fixed jaw, a bracket thereon, a movable jaw guided by the bracket, springs tending to hold the movable jaw open, a lever for closing the movable jaw, a movable member on which the lever is fulcrumed, a screw for adjusting the position of the member, a bell crank lever mounted on the bar, a connection between the two levers, and electrical means mounted on the bar to operate through the bell crank lever to throw the first-mentioned lever to jaw-closing position.

10. In an electric welding machine, the combination of a bar forming a conductor and serving as a fixed jaw, a movable jaw, means for mounting the movable jaw on the bar, a jaw-closing lever, springs tending to hold the movable jaw open, a movable device on which the lever is mounted, a block pivoted on the device, an adjusting screw for shifting the block to change the position of the lever to close the movable jaw in different positions, and means for operating the lever.

In testimony whereof we affix our signatures in presence of two witnesses.

LAFAYETTE M. PRYOR
JESSE L. TRAPP.

Witnesses:
H. W. MINER,
G. L. RAMEY.